United States Patent
Lee et al.

(10) Patent No.: US 10,942,551 B2
(45) Date of Patent: Mar. 9, 2021

(54) NOTEBOOK COMPUTER WITH NORMALLY OPEN SWITCH WHOSE CONDUCTIVE STATE IS DETERMINED BY ANGLE BETWEEN DISPLAY DEVICE AND COMPUTER HOST

(71) Applicants: INVENTEC (PUDONG) TECHNOLOGY CORPORATION, Shanghai (CN); INVENTEC CORPORATION, Taipei (TW)

(72) Inventors: Kuan-Wei Lee, Taipei (TW); Jui Hsiang Chen, Taipei (TW); I-Ko Song, Taipei (TW); Chun-Chi Lin, Taipei (TW)

(73) Assignees: INVENTEC (PUDONG) TECHNOLOGY CORPORATION, Shanghai (CN); INVENTEC CORPORATION, Taipei (TW)

( * ) Notice: Subject to any disclaimer, the term of this patent is extended or adjusted under 35 U.S.C. 154(b) by 118 days.

(21) Appl. No.: 16/296,804

(22) Filed: Mar. 8, 2019

(65) Prior Publication Data
US 2020/0166979 A1    May 28, 2020

(30) Foreign Application Priority Data
Nov. 26, 2018    (CN) .......................... 201811417611.0

(51) Int. Cl.
| G06F 1/12 | (2006.01) |
| G06F 1/26 | (2006.01) |
| H05B 45/00 | (2020.01) |
| G06F 1/16 | (2006.01) |

(52) U.S. Cl.
CPC .............. *G06F 1/26* (2013.01); *G06F 1/1618* (2013.01); *G06F 1/1681* (2013.01); *H05B 45/00* (2020.01)

(58) Field of Classification Search
None
See application file for complete search history.

(56) References Cited

U.S. PATENT DOCUMENTS

| 5,256,882 A | * | 10/1993 | Miyasaka | ............... G05F 1/625 250/551 |
| 5,717,627 A | * | 2/1998 | Mizushima | ............. G11C 11/42 250/205 |
| 6,330,176 B1 | * | 12/2001 | Thrap | ..................... H02J 3/005 363/142 |
| 2007/0171606 A1 | * | 7/2007 | Iwai | ........................ G06F 1/263 361/679.55 |
| 2009/0144574 A1 | * | 6/2009 | Tseng | .................... G06F 1/1616 713/323 |
| 2012/0293892 A1 | * | 11/2012 | Chen | ........................ G06F 1/28 361/18 |

(Continued)

*Primary Examiner* — Danny Chan
(74) *Attorney, Agent, or Firm* — Maschoff Brennan (57) ABSTRACT

This disclosure relates to a notebook computer including a computer body and a power transmission device which having an input port and an output port opposite to each other. The input port is configured to be electrically connected to a power supply. The output port is electrically connected to the computer body. The power transmission device includes an actuating circuit and a hold circuit. The actuating circuit is electrically connected between the input port and the output port. The hold circuit is connected in parallel to the actuating circuit.

2 Claims, 6 Drawing Sheets

(56) References Cited

U.S. PATENT DOCUMENTS

| | | | |
|---|---|---|---|
| 2014/0191999 A1* | 7/2014 | Kim | G06F 1/3262 345/173 |
| 2017/0083055 A1* | 3/2017 | Wu | G06F 1/3206 |
| 2017/0235355 A1* | 8/2017 | Alshinnawi | G06F 1/3278 713/323 |
| 2020/0081518 A1* | 3/2020 | Yang | G06F 1/3287 |

* cited by examiner

NOTEBOOK COMPUTER WITH NORMALLY OPEN SWITCH WHOSE CONDUCTIVE STATE IS DETERMINED BY ANGLE BETWEEN DISPLAY DEVICE AND COMPUTER HOST

CROSS-REFERENCE TO RELATED APPLICATIONS

This non-provisional application claims priority under 35 U.S.C. § 119(a) on Patent Application No(s). 201811417611.0 filed in China, P.R.C. on Nov. 26, 2018, the entire contents of which are hereby incorporated by reference.

TECHNICAL FIELD

The present disclosure relates to a notebook computer, more particularly to a notebook computer that can boot up by opening the lid thereof.

BACKGROUND

A power button of a conventional notebook computer is often set on a side of the computer host, which is at the base of the conventional notebook while said side usually faces the lid, and the user can press the power button to boot up the notebook computer.

SUMMARY

According to one aspect of the present disclosure, a notebook computer including a computer body and a power transmission device. The power transmission device has an input port and an output port opposite to each other. The input port is configured to be electrically connected to a power supply. The output port is electrically connected to the computer body. The power transmission device includes an actuating circuit and a hold circuit. The actuating circuit is electrically connected between the input port and the output port. The hold circuit is connected in parallel to the actuating circuit.

BRIEF DESCRIPTION OF THE DRAWINGS

The present disclosure will become more fully understood from the detailed description given hereinbelow and the accompanying drawings which are given by way of illustration only and thus are not intending to limit the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 1:
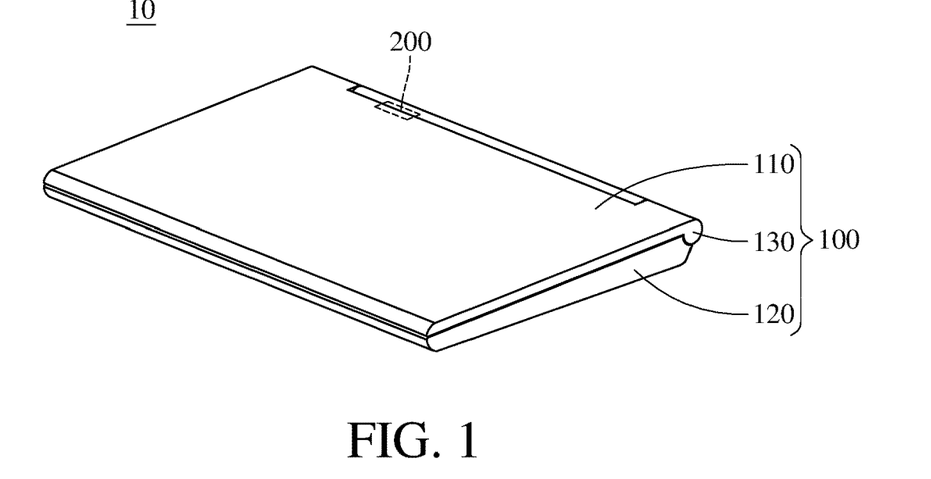
FIG. 1 is a perspective view of a notebook computer according to one embodiment of the present disclosure.
Figure 2:
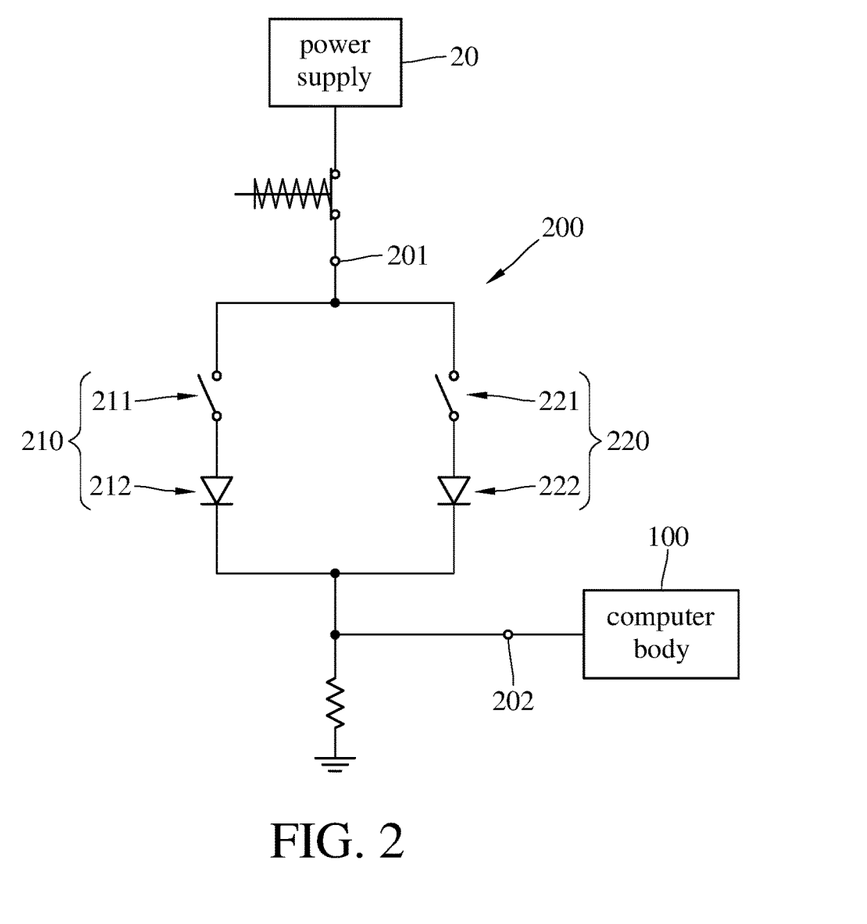
FIG. 2 is a circuit diagram of the notebook computer in FIG. 1, with a power transmission device in a breaking state.

Please refer to FIG. 1 and FIG. 2. FIG. 1 is a perspective view of a notebook computer 10 according to one embodiment of the present disclosure. FIG. 2 is a circuit diagram of the notebook computer 10 in FIG. 1, with a power transmission device 200 in a breaking state.

Specifically, the notebook computer 10 of this embodiment including a computer body 100 and the power transmission device 200. The power transmission device 200 has an input port 201 and an output port 202 opposite to each other. The input port 201 is configured to be electrically connected to a power supply 20. The output port 202 is electrically connected to the computer body 100. The power transmission device 200 includes an actuating circuit 210 and a hold circuit 220. The actuating circuit 210 is electrically connected between the input port 201 and the output port 202 and is configured to actuate the hold circuit 220 when the actuating circuit 210 is triggered. The hold circuit 220 is connected in parallel to the actuating circuit 210. Once the hold circuit 220 is actuated by the actuating circuit 210, the hold circuit 220 remains in a conductive state even though the actuating circuit 210 turns into a breaking state so as to maintain the power transmission device 200 in a conductive state.

In detail, in this and some embodiments, the computer body 100 may further include a display device 110 at a lid of the computer body 100, a computer host 120 at a base of the computer body 100, and a pivotable component 130. The pivotable component 130 is connected between the display device 110 and the computer host 120 so that the display device 110 is pivotably connected to the computer host 120 via the pivotable component 130. The actuating circuit 210 may further include a normally open switch 211 and a first light-emitting diode 212. The normally open switch 211 is, for example, located in the pivotable component 130. The normally open switch 211 is connected in series to the first light-emitting diode 212 and is in a breaking state initially. The first light-emitting diode 212 has a first illuminating surface (not shown). The hold circuit 220 may further include a light activated switch 221 and a second light-emitting diode 222. The light activated switch 221 is connected in series to the second light-emitting diode 222 and is in a breaking state initially. The second light-emitting diode 222 has a second illuminating surface (not shown). The first illuminating surface and the second illuminating surface are configured to illuminate the light activated switch 221.

Figure 3:
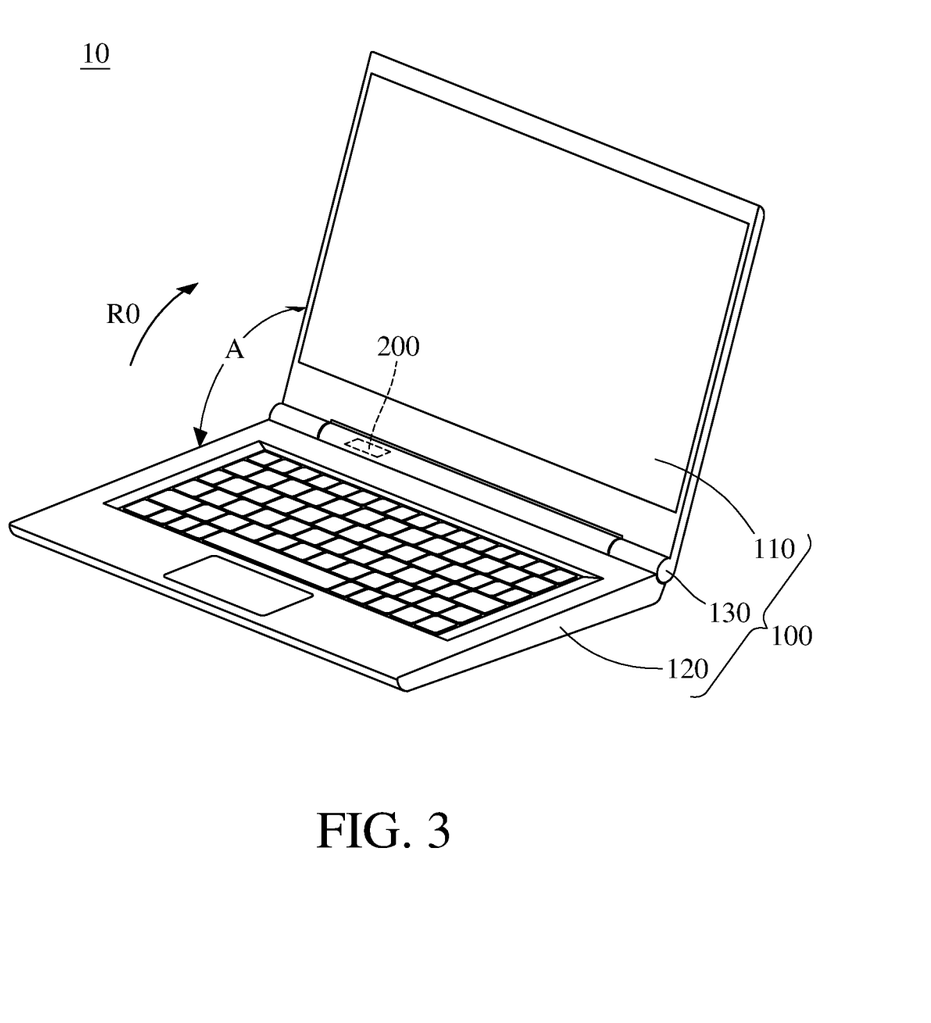
FIG. 3 is a perspective view of the notebook computer in FIG. 1 when a lid with a display device is opened.
Figure 4:
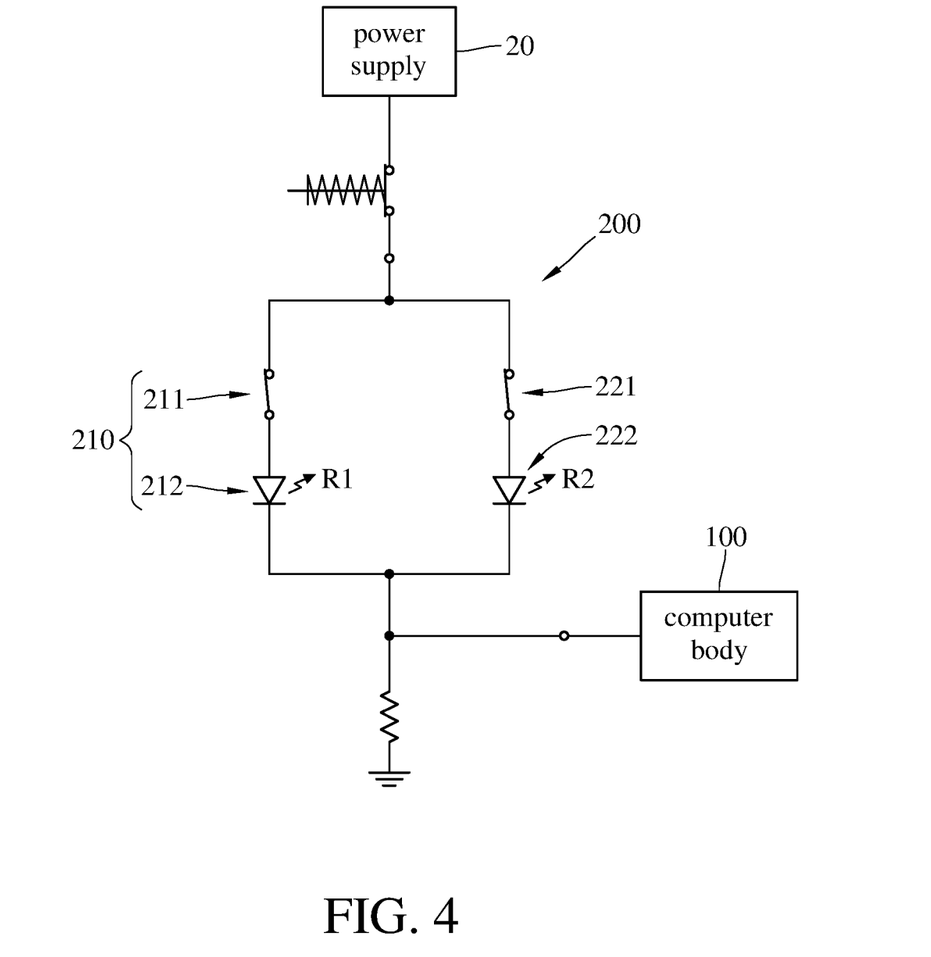
FIG. 4 is a circuit diagram of the notebook computer in FIG. 3, with the power transmission device in a conductive state.

Please refer to FIG. 3 and FIG. 4. FIG. 3 is a perspective view of the notebook computer 10 in FIG. 1 when the lid with the display device 110 is opened. FIG. 4 is a circuit diagram of the notebook computer 10 in FIG. 3, with the power transmission device 200 in the conductive state. The display device 110 is rotated in a pivoting direction R0 relatively to the computer host 120, and the normally open switch 211 turns into a conductive state from the breaking state as shown in FIG. 4. As such, the actuating circuit 210 is electrically connected to the power supply 20 and the computer body 100 so as to boot up the notebook computer 10. The details of the normally open switch 211 turning into the conductive state from the breaking state by rotating the display device 110 relatively to the computer host 120 will be described later with FIG. 7 and FIG. 8. When the normally open switch 211 is in the conductive state, the first light-emitting diode 212 emits light from the first illuminating surface to the light activated switch 221 via a first route R1. When the light activated switch 221 receives light, the light activated switch 221 turns into a conductive state from the braking state such that the second light-emitting diode 222 emits light from the second illuminating surface to the light activated switch 221 via a second route R2. The first illuminating surface or the second illuminating surface is preferably facing the light activated switch 221, but the disclosure is not limited thereto. In some embodiments, the first illuminating surface or the second illuminating surface may face a mirror and illuminate the light activated switch via the mirror by light reflection.

Figure 5:
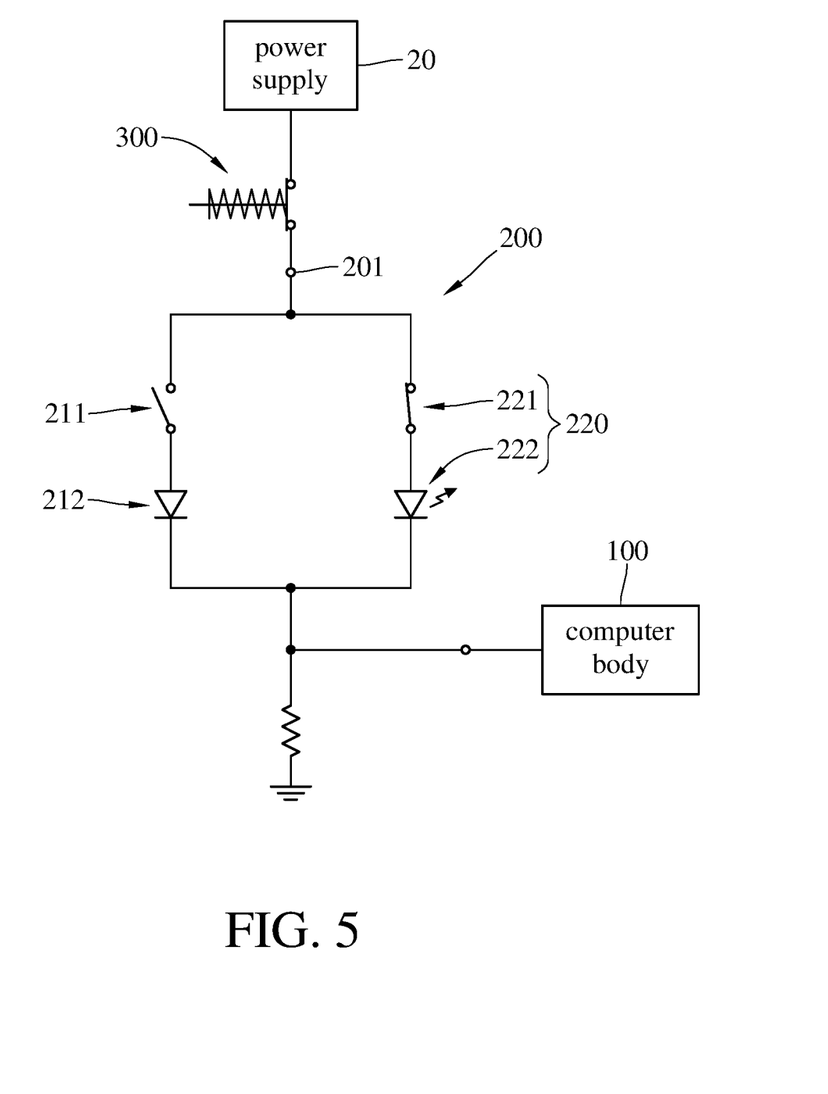
FIG. 5 is a circuit diagram of the notebook computer in FIG. 1, with a hold circuit in a conductive state.

Please refer to FIG. 1 and FIG. 5, which FIG. 5 is a circuit diagram of the notebook computer 10 in FIG. 1, with the hold circuit 220 in the conductive state. When the lid with the display device 110 is closed relatively to the computer host 120, the normally open switch 211 returns to the breaking state from the conductive state. As such, the first light-emitting diode 212 does not emit light. However, at this time, the second light-emitting diode 222 still illuminates the light activated switch 221, resulting the light activated switch 221 to remain in the conductive state still. Therefore, even if the lid with the display device 110 is closed relatively to the computer host 120, the computer body 100 can still be electrically connected to the power supply 20 via the hold circuit 220 so as to maintain the operation of the notebook computer 10.

Figure 6:
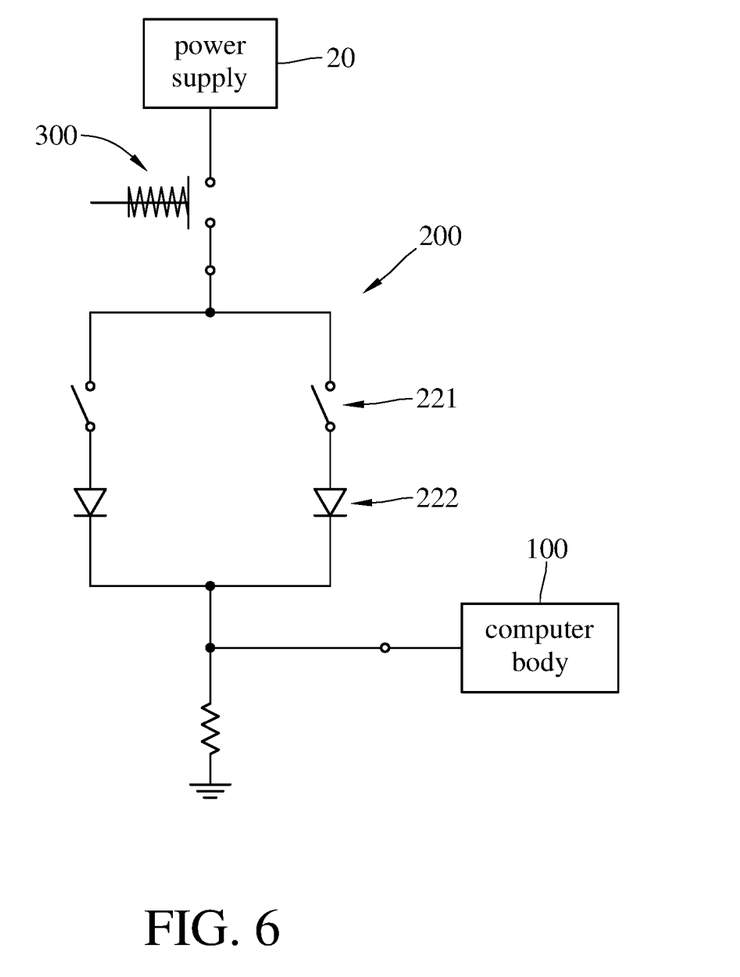
FIG. 6 is a circuit diagram of the notebook computer in FIG. 1, with a normally closed switch in a breaking state.

Please refer to FIG. 5 and FIG. 6. FIG. 6 is a circuit diagram of the notebook computer 10 in FIG. 1, with a normally closed switch 300 in a breaking state. In this and some embodiments, the notebook computer 10 may further include the normally closed switch 300. As shown in FIG. 5, the normally closed switch 300 is in a conductive state initially and is connected to the input port 201. The input port 201 is configured to be electrically connected to the power supply 20 via the normally closed switch 300. When the user wants to shut down the notebook computer 10, the normally closed switch 300 is pressed by, for example, an abutment member (not shown in drawings) such that the normally closed switch 300 turns into a breaking state as shown in FIG. 6. As such, the second light-emitting diode 222 does not emit light, resulting the light activated switch 221 returning to the breaking state. The normally closed switch 300 is in the conductive state when the abutment member is separated from the normally closed switch 300, and thereby the power transmission device 200 returns to the state as shown in FIG. 2.

In summary, by opening the lid with the display device 110, the computer body 100 is electrically connected to the power supply 20 via the power transmission device 200 in the conductive state as shown in FIG. 4, and the notebook computer 10 can boot up in a simple and fast manner. Next, the power transmission device 200 is still in a conductive state as shown in FIG. 5 when the lid with the display device 110 is closed. As such, the computer body 100 can be continuously powered by the power supply 20 so as to maintain the operation of the notebook computer 10. Furthermore, when the user shuts down the notebook computer 10 through the program, the normally closed switch 300 returns to the breaking state from the conductive state, resulting the computer body 100 to electrically disconnect with the power supply 20. Consequently, both the power transmission device 200 and normally closed switch 300 are in the breaking state as shown in FIG. 6, and the notebook computer 10 shuts down. Finally, as shown in FIG. 2, the normally closed switch 300 is in the conductive state when the abutment member is separated from the normally closed switch 300, and the power transmission device 200 maintains in the breaking state.

Figure 7:
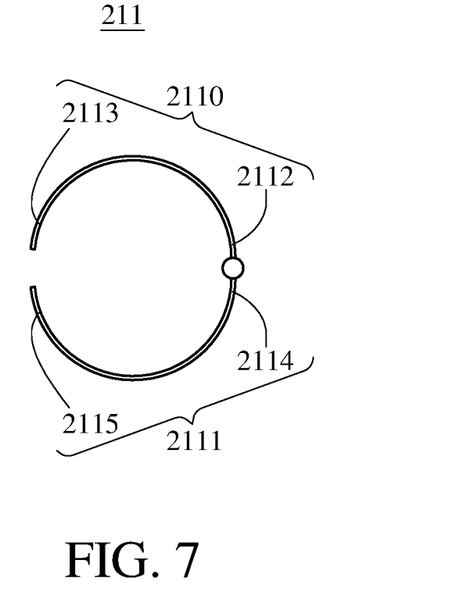
FIG. 7 is a schematic view of the power transmission device in FIG. 2, with a normally open switch in a breaking state.
Figure 8:
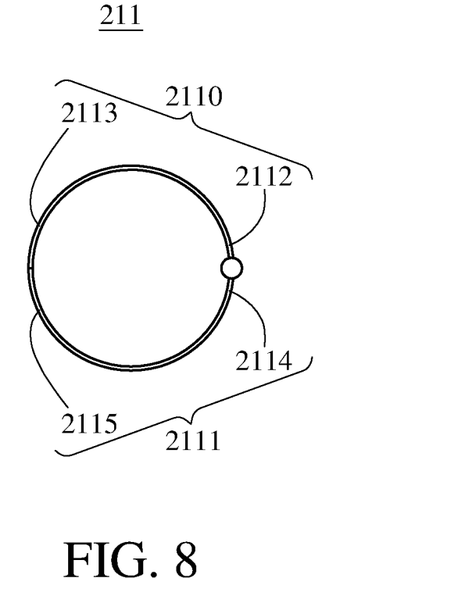
FIG. 8 is a schematic view of the power transmission device in FIG. 4, with the normally open switch in a conductive state.

Please refer to FIG. 1 to FIG. 5 and FIG. 7 to FIG. 8. FIG. 7 is a schematic view of the power transmission device 200 in FIG. 2, with the normally open switch 211 in the breaking state. Moreover, FIG. 8 is a schematic view of the power transmission device 200 in FIG. 4, with the normally open switch 211 in the conductive state. In this and some embodiments, the normally open switch 211 may further include a first part 2110 and a second part 2111 opposite to each other. The first part 2110 is connected to the display device 110, and the second part 2111 is connected to the computer host 120. The first part 2110 may further have a first insulation end 2112 and a first conductive end 2113, and the second part 2111 may further have a second insulation end 2114 and a second conductive end 2115. The first insulation end 2112 is connected to the second insulation end 2114. As shown in FIG. 1, when the lid with the display device 110 is closed relatively to the computer host 120, the power transmission device 200 is in the abovementioned breaking state as shown in FIG. 2 and the mechanism of the normally open switch 211 is shown in FIG. 7. Since the first conductive end 2113 is not electrically connected to the second conductive end 2115, the normally open switch 211 is in the breaking state.

When the display device 110 rotates along with the first conductive end 2113 in the pivoting direction R0 relatively to the computer host 120 as shown in FIG. 3 and an incline angle A between the display device 110 and the computer host 120 is in an angle range from 5° to 150°, the first conductive end 2113 is electrically connected to the second conducive end 2115, the normally open switch 211 is in the conductive state as shown in FIG. 8, and the power transmission device 200 is in the abovementioned conductive state as shown in FIG. 4. When the lid with the display device 110 is closed relatively to the computer host 120 as shown in FIG. 1 and the incline angle A is out of the angle range, the first conductive end 2113 is separated from the second conductive end 2115, the normally open switch 211 is in the breaking state as shown in FIG. 7, and the power transmission device 200 is in the abovementioned conductive state as shown in FIG. 5. The process for shutting down the notebook computer 10 is as described above and will not be repeated here.

Figure 9:
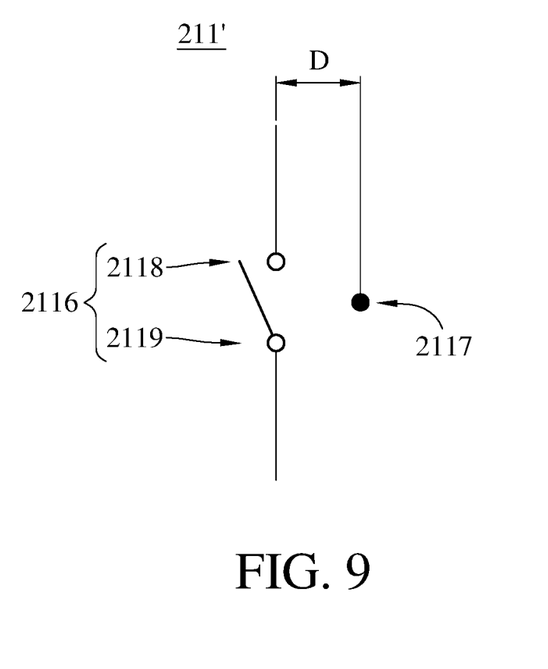
FIG. 9 is a schematic view of a normally open switch in a breaking state of a notebook computer according to another embodiment of the present disclosure.
Figure 10:
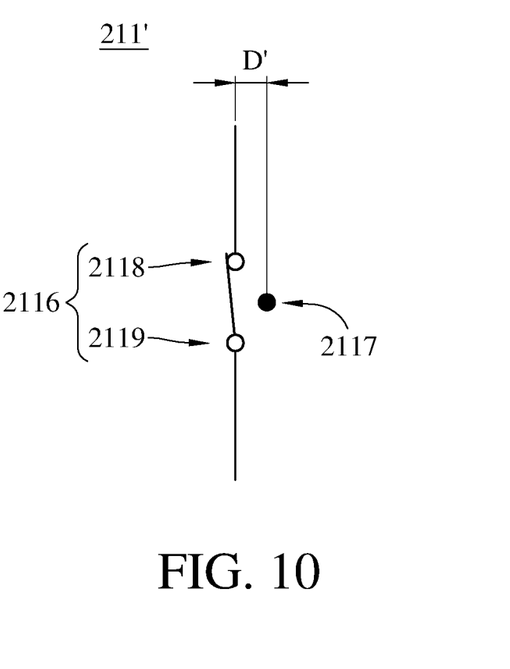
FIG. 10 is a schematic view of the normally open switch in FIG. 9 in a conductive state.

The mentioned structure that the normally open switch 211 connects the display device 110 and the computer host 120 with the first part 2110 and the second part 2111 respectively to achieve the above function is not intended to limit the present disclosure. Please refer to FIG. 1, FIG. 3, FIG. 9 and FIG. 10. FIG. 9 is a schematic view of a normally open switch 211' in a breaking state of a notebook computer according to another embodiment of the present disclosure. FIG. 10 is a schematic view of the normally open switch 211' in FIG. 9 in a conductive state. In this and some embodiments, the normally open switch 211' may further include a main body 2116 and a magnetic component 2117. As shown in FIG. 9, the main body 2116 and the magnetic component 2117 are spaced apart from each other by a distance D. The main body 2116 is connected to the computer host 120 and the magnetic component 2117 is connected to the display device 110, but the disclosure is not limited thereto. In other embodiments, the main body is connected to the display device and the magnetic component is connected to the computer host. In this and some embodiments, the main body 2116 may further include a free part 2118 and a fixed part 2119. An elastic tension of the free part 2118 is larger than a magnetic attraction between the magnetic component 2117 and the free part 2118. Therefore, the main body 2116 is not affected by the magnetic component 2117 and is in a breaking state.

When the display device 110 rotates along with the magnetic component 2117 in the pivoting direction R0 relatively to the computer host 120 as shown in FIG. 3 and the incline angle A between the display device 110 and the computer host 120 is in an angle range from 5° to 150°, the magnetic component 2117 is close to the free part 2118, the distance D between the main body 2116 and the magnetic component 2117 is changed to a distance D'. In such a case, the magnetic attraction between the magnetic component 2117 and the free part 2118 is larger than the elastic tension of the free part 2118. As such, the free part 2118 is attracted by the magnetic component 2117 and is electrically connected to the fixed part 2119, and the normally open switch 211 is in the conductive state as shown in FIG. 10. The process performed when the lid with the display device 110 is closed relatively to the computer host 120 and the process for shutting down the notebook computer 10 are as described above and will not be repeated here.

According the notebook computer discussed above, by opening the lid with the display device, the computer body is electrically connected to the power supply via the power transmission device, and the notebook computer can boot up in a simple and fast manner. Next, the power transmission device is still in the conductive state when the lid with the display device is closed. As such, the computer body can be continuously powered by the power supply. Furthermore, when the user shuts down the notebook computer through the program, the normally closed switch returns to the breaking state from the conductive state, resulting the computer body to electrically disconnect with the power supply and the notebook computer shuts down. Finally, the normally closed switch is in the conductive state when the abutment member is separated from the normally closed switch.

In some embodiments, the normally open switch may further include a first part and a second part opposite to each other. When the display device rotates along with the first conductive end relatively to the computer host and the incline angle between the display device and the computer host is in the angle range, the first conductive end is electrically connected to the second conducive end and the normally open switch is in the conductive state. When the lid with the display device is closed relatively to the computer host and the incline angle is out of the angle range, the first conductive end is separated from the second conductive end and the normally open switch is in the breaking state.

In some embodiments, the normally open switch may further include a main body and a magnetic component. When the display device rotates along with the magnetic component relatively to the computer host and the incline angle between the display device and the computer host is in the angle range, the magnetic component is close to the free part. In such a case, the magnetic attraction between the magnetic component and the free part is larger than the elastic tension of the free part. As such, the free part is attracted by the magnetic component and is electrically connected to the fixed part, and the normally open switch is in the conductive state.

The embodiments are chosen and described in order to best explain the principles of the present disclosure and its practical applications, to thereby enable others skilled in the art best utilize the present disclosure and various embodiments with various modifications as are suited to the particular use being contemplated. It is intended that the scope of the present disclosure is defined by the following claims and their equivalents.

What is claimed is:

1. A notebook computer, comprising:
a computer body; and
a power transmission device, having an input port and an output port opposite to each other;
wherein the input port is configured to be electrically connected to a power supply, the output port is electrically connected to the computer body, and the power transmission device comprises:
an actuating circuit, electrically connected between the input port and the output port; and
a hold circuit, connected in parallel to the actuating circuit;
wherein the actuating circuit further comprises a normally open switch and a first light-emitting diode, the normally open switch is connected in series to the first light-emitting diode, the hold circuit further comprises a light activated switch and a second light-emitting diode, the light activated switch is connected in series to the second light-emitting diode, and the first light-emitting diode and the second light-emitting diode are able to illuminate the light activated switch;
wherein the computer body further comprises a display device, a computer host and a pivotable component, the pivotable component is connected between the display device and the computer host, the display device is pivotably disposed to the computer host via the pivotable component, and the normally open switch is located in the pivotable component; and
wherein the normally open switch further comprises a first part and a second part opposite to each other, the first part is connected to the display device, the second part is connected to the computer host, the first part further has a first insulation end and a first conductive end, the second part further has a second insulation end and a second conductive end, and the first insulation end is connected to the second insulation end; when an incline angle between the display device and the computer host is in an angle range, the first conductive end is electrically connected to the second conductive end and the normally open switch is in a conductive state; when the incline angle is out of the angle range, the first conductive end is separated from the second conductive end and the normally open switch is in a breaking state, wherein the angle range from 5° to 150°.

2. The notebook computer according to claim 1, further comprising a normally closed switch connected to the input port, wherein the input port is configured to be electrically connected to the power supply via the normally closed switch.

* * * * *